(12) United States Patent
Abramov et al.

(10) Patent No.: US 10,791,347 B2
(45) Date of Patent: Sep. 29, 2020

(54) NETWORK-BASED EVENT RECORDING

(71) Applicant: Sling Media L.L.C., Foster City, CA (US)

(72) Inventors: Andrey Abramov, Foster City, CA (US); Dmitry Dimov, San Francisco, CA (US); Chih Jen Ken Lee, Albany, CA (US); Naga Venkata Gnana Meherkanth Vurimi, San Bruno, CA (US); Oleksandr Yegorov, San Francisco, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 15/367,750

(22) Filed: Dec. 2, 2016

(65) Prior Publication Data

US 2017/0164062 A1 Jun. 8, 2017

Related U.S. Application Data

(60) Provisional application No. 62/263,087, filed on Dec. 4, 2015.

(51) Int. Cl.
*H04N 21/234* (2011.01)
*H04N 21/258* (2011.01)
(Continued)

(52) U.S. Cl.
CPC ... *H04N 21/23418* (2013.01); *H04N 21/2187* (2013.01); *H04N 21/21805* (2013.01);
(Continued)

(58) Field of Classification Search
CPC ........... H04N 21/4826; H04N 21/4344; H04N 21/4524; H04N 21/4532; H04N 21/6334;
(Continued)

(56) References Cited

U.S. PATENT DOCUMENTS

| 9,143,742 B1 | 9/2015 | Amira et al. |
| 2006/0251382 A1* | 11/2006 | Vronay ................ G11B 27/034 386/242 |
| 2008/0037826 A1* | 2/2008 | Sundstrom ............. H04N 5/772 386/E5.072 |
| 2008/0126109 A1 | 5/2008 | Cragun et al. |

(Continued)

FOREIGN PATENT DOCUMENTS

| JP | 2003-150494 A2 | 5/2003 |
| JP | 2003-179908 A2 | 6/2003 |
| JP | 2009-267999 A2 | 11/2009 |

OTHER PUBLICATIONS

International Search Report and Written Opinion of International Searching Authority in PCT/US2016/064787 dated Mar. 7, 2017 (13 pages).

(Continued)

*Primary Examiner* — Pankaj Kumar
*Assistant Examiner* — Alexander Boyd
(74) *Attorney, Agent, or Firm* — Kilpatrick Townsend & Stockton LLP (57) ABSTRACT

A system includes a computing device including a processor and a memory storing instructions executable by the processor. The processor is programmed to establish, for a recording event, one or more respective communications channels between the computing device and each of one or more media devices; receive one or more media input items from the one or more respective media devices; receive data indicating at least one of a range of capture of the respective media input item relative to a location of the recording event, a quality of the respective media input item, an excitement level of the respective media input item, an identity of the respective media device, and an identity of an operator of the respective media device; and generate a media output item based at least in part on the one or more media input items, and further based at least in part on the data.

16 Claims, 4 Drawing Sheets

(51) Int. Cl.
- *H04N 21/218* (2011.01)
- *H04N 21/442* (2011.01)
- *H04N 21/2743* (2011.01)
- *H04N 21/462* (2011.01)
- *H04N 21/2187* (2011.01)
- *H04N 21/2665* (2011.01)
- *H04N 21/235* (2011.01)
- *H04N 21/433* (2011.01)
- *H04N 21/45* (2011.01)
- *H04N 21/482* (2011.01)
- *H04N 21/6334* (2011.01)

(52) U.S. Cl.
CPC ..... *H04N 21/235* (2013.01); *H04N 21/25816* (2013.01); *H04N 21/25841* (2013.01); *H04N 21/2665* (2013.01); *H04N 21/2743* (2013.01); *H04N 21/4334* (2013.01); *H04N 21/44218* (2013.01); *H04N 21/4524* (2013.01); *H04N 21/4532* (2013.01); *H04N 21/4622* (2013.01); *H04N 21/4826* (2013.01); *H04N 21/6334* (2013.01)

(58) Field of Classification Search
CPC .......... H04N 21/23418; H04N 21/235; H04N 21/25816; H04N 21/21805; H04N 21/44218; H04N 21/2743; H04N 21/4622; H04N 21/25841; H04N 21/2187; H04N 21/2665; H04N 21/4334
See application file for complete search history.

(56) References Cited

U.S. PATENT DOCUMENTS

| | | | |
|---|---|---|---|
| 2009/0063561 A1* | 3/2009 | Sayko | H04N 21/23418 |
| 2009/0087161 A1 | 4/2009 | Roberts et al. | |
| 2012/0233000 A1* | 9/2012 | Fisher | G06Q 30/02 |
| | | | 705/14.71 |
| 2012/0320013 A1* | 12/2012 | Perez | H04N 21/2743 |
| | | | 345/207 |
| 2013/0176438 A1* | 7/2013 | Mate | H04N 21/21805 |
| | | | 348/157 |
| 2013/0188923 A1 | 7/2013 | Hartley et al. | |
| 2013/0222601 A1 | 8/2013 | Engstrom et al. | |
| 2013/0259446 A1 | 10/2013 | Sathish | |
| 2013/0343726 A1* | 12/2013 | Shackleton | H04N 21/4532 |
| | | | 386/282 |
| 2014/0259037 A1* | 9/2014 | Belyaev | H04N 21/44008 |
| | | | 725/14 |
| 2015/0110461 A1 | 4/2015 | Maisenbacher et al. | |
| 2016/0192009 A1* | 6/2016 | Sugio | H04N 21/21805 |
| | | | 725/32 |
| 2016/0225410 A1* | 8/2016 | Lee | H04N 21/21805 |

OTHER PUBLICATIONS

Notice of Rejection for Japanese Patent Appln. No. 2018-528953 dated Jul. 2, 2019, all pages.

Office Action for Canadian Patent Appin. No. 3,007,355, dated Apr. 17, 2019, all pages.

European Office Action for EP 16822802.1 dated Jan. 28, 2020 and received Feb. 3, 2020, all pages.

\* cited by examiner

NETWORK-BASED EVENT RECORDING

CROSS-REFERENCE TO RELATED APPLICATIONS

This application claims priority to and all benefits of U.S. Provisional Patent Application No. 62/263,087 filed Dec. 4, 2015.

BACKGROUND

The use of streamed media data such as video data has increased rapidly. Videos are used to record and view sports events, to share personal and family events, to sell real estate, etc. The widespread use of smartphones and digital cameras programmed to record video data has put video recording capabilities into the hands of a large number of people. Users may wish to incorporate media data from multiple sources into a single output data stream to share immediately or store for later viewing. Additionally, users may wish to view several different media output items from the same event on different display devices.

DETAILED DESCRIPTION

System Overview

A server is programmed to receive media input items related to a recording event from a plurality of media devices and generate one or more media output items based on the media input items. As described in additional detail below, the server is also programmed to receive additional data. The additional data may be related to the recording event, a media input item, a participant in the event, etc. A recording event, as used herein, is defined as an event being recorded, for example, a football game or company picnic, including the environment, participants, media devices, media device operators (sometimes referred to herein as media providers), sensors and other data collectors, producers, viewers, audience, etc. related to the event. The server may be programmed to register the media devices prior to or during the recording event. The server is programmed to receive media input items from the media devices during the event. Based on the media input items and further based on one or more predetermined rules, the server may be programmed to generate one or more media output items.

In some cases, the server may further be programmed to receive input from a producer, and generate the media output item based, at least in part, on the producer input. A producer, as used herein, is a user who is given the ability to make decisions regarding the content of a media output item. The producer input may be received, for example, via a user interface. The user interface may be included in the server, or may be included in, e.g., a remote device communicatively coupled to the server.

In addition to media input items, the server may receive data from data collectors. Data collectors may be, e.g., included in a media device that is filming the event, included in a computing device such as a smartphone, smart watch, or fitness band associated with an operator of a camera or a participant in the recording event; or independent such as weather sensors, etc. The data may be received directly from the data collectors or indirectly, for example, via metadata associated with the media input items. The selection of media input items for inclusion in the media output item and/or for further media processing may be based in part on the data from the data collectors.

A variety of types of data may be used by the server. For example, the data may include biometric data (e.g., heart rate, blood pressure, etc.) associated with a user of a camera or an observer of the event, and which may be used, e.g., to determine an excitement level of the user or observer. As another example, the data may be data indicative of the quality of a media input item such as steadiness of a camera, contrast of an image, etc. Still further, the data may include position data or movement data associated with an object or participant in the event to be recorded (e.g., a player in a sports event, a ball being used in a sports event, etc.). Still further, the data may include global positioning data, weather data, light conditions, etc. related to the recording environment. Other types of data, collected from sensors, or, e.g., from other computing devices, may also be used for selecting the content for and/or generating the media output item.

The predetermined rules for generating the media output items may include making decisions based on the input from the one or more data collectors. For example, in order to be included in the media output item, the media input item may need to meet quality criteria such as having a picture contrast within a predetermined range or being sufficiently steady (e.g., a shaking level below a predetermined threshold). The use of data from data collectors for determining a media output item will be discussed in detail below.

The server may, based on data from data collectors such as position data related to the media devices, etc. analyze and evaluate the media input items. For example, the server may generate a rating respectively of a quality of the image, an excitement level associated with an image or a sequence, the content of the image, a range of capture of the image, etc. A rating may indicate a level of a characteristic (e.g., quality) as compared to a predetermined scale, as described below. An overall rating may indicate a combination of the individual ratings according to, e.g., a predetermined weighting.

The server may further, based on the evaluation, generate one or more rankings of the media input items relative to other media input items. The rankings may indicate a relative preference for including a media input item in a particular media output item. As discussed below, the rankings may be based on particular targets established for particular media output items.

The server may implement one or more operations associated with stakeholders of the recording event. Stakeholders may include, e.g., owners of the event, viewers of the event, investors in the event, media providers (e.g., operators of cameras), producers of the event, participants in the event, etc. By way of example and not limitation, the server may perform one or more of the following operations.

With regard to owners, the server may, e.g., support creation of a website, send out invitations to investors, record investor activity, etc.

With regard to viewers, the server may, e.g., track viewing activities, collect feedback, maintain a viewer profile, invite viewers to watch/subscribe to a recording event, etc. The server may further, e.g., establish one or more groups of viewers with, e.g., different levels of access, different interests, etc.

With regard to producers, the server may, e.g., invite producers to produce the event, grant permission/access to producers to event resources such as media input items, send messages to media device (e.g., camera) operators, support a job application process, etc.

With regard to investors, the server may, e.g., provide investment related information, support a bidding process, support the transfer of funds, support the formation of contracts, etc.

With regard to media device operators, the server may create and update operator profiles, support a job application process, provide feedback to media device operators prior to, during, and after a recording event, etc.

With regard to participants in the event, the server may provide recording event information, support a registration process, provide access to participant specific media output items (recordings), etc.

The server may additionally implement stakeholder profiles, security operations, authentication of stakeholders, payment mechanisms, advertisement engines, etc.

Aggregating the data from multiple media input devices allows multiple media providers to contribute to an event recording. Further, multiple, customized versions of the recording may be made, according to the specifications of different viewers/groups of users.

Exemplary System Elements

Figure 1:
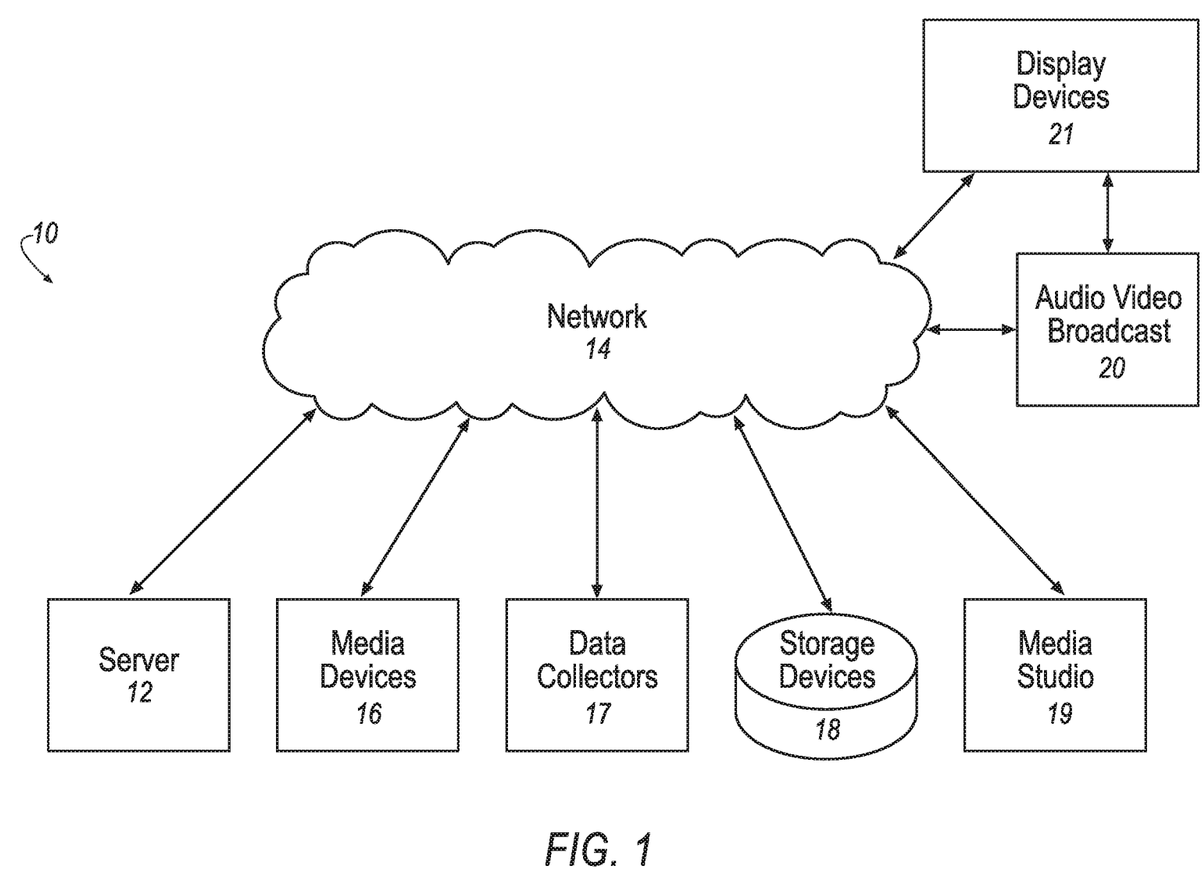
FIG. 1 is a block diagram of an exemplary network-based media processing system for capturing and mixing multiple media input items into a media output stream.

Referring now to FIG. 1, the media processing system 10 includes a server 12, one or more media devices 16, one or more data collectors 17, one or more storage devices 18, one or more audio-video broadcasters 20, and one or more viewer display devices 21. The media processing system 10 may further include one or more media studios 19. The server 12, one or more media devices 16, one or more data collectors 17, one or more storage devices 18, one or more media studios 19, one or more audio-video broadcasters 20, and one or more viewer display devices 21 may be communicatively coupled via the network 14.

Figure 2:
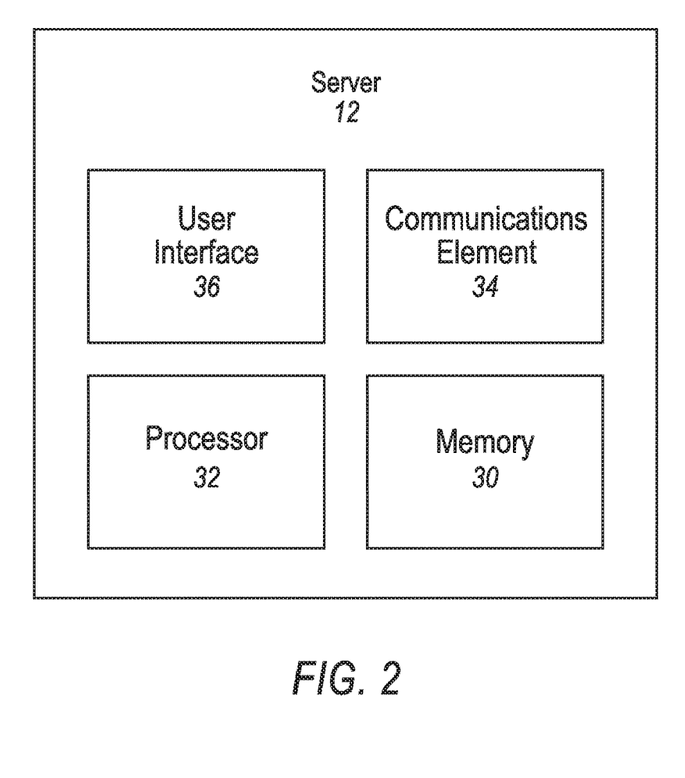
FIG. 2 is a block diagram of an exemplary server for the media processing system of FIG. 1.

As shown in FIG. 2, the server 12 includes a memory 30 and one or more processors 32 configured to perform programs, i.e., sets of computer-executable instructions, stored in the memory 30. The server 12 further includes a communications element 34 for communicating via the network 14, and a user interface 36. The server 12 is generally programmed to establish communications with one or more media devices 16, receive media input items from the media devices 16, and generate media output items based on the received media input items.

The media input items may be visual and/or audio data such as videos captured by a video camera, sounds captured by a microphone, scenes from a security camera, etc. The media input items may be, e.g., streamed data or static data such as single digital photographs. The server 12 is programmed to select media input items to be included in a media output according to one or both of predetermined set of rules and input from a producer.

As an example, the server 12 may receive eight media input items respectively from eight media devices 16. The server 12 may be programmed to evaluate a quality level of the eight media input items, as described below. The server 12 may determine a quality level respectively for each of the eight media input items. Based on the determined quality levels, the server 12 may select, e.g., the four media input items with the highest quality levels, for inclusion in the media output item. Further, the server 12 may, based on a predetermined rule, generate the media output item by sequentially switching between the four media input items with the highest quality. Alternatively, the server 12 may, e.g., present the four media input items determined to have the highest quality levels to a producer, and the producer may select, for example, via the user interface 36, one or more of the media input items to be included in the media output item.

In addition to selecting one or more media input items to be included in the media output item, the server 12 may perform various media processing operations. The media processing operations may be performed based on commands received from a producer via the user interface 36. A nonlimiting list of processing operations which may be performed by the server 12 includes scaling, mixing, morphing, compositing, adding overlays, etc. In addition, the server 12 may perform operations such as object tracking, image stabilization, etc. The operation of the server 12 will be discussed in greater detail below.

In some cases, the server 12 may generate one or more media output items, and provide the one or more media output items to a media studio 19. In these cases, the media studio 19 may perform additional processing on the media output items. For example, the media studio 19 may perform mixing operations, according to predetermined rules or according to the input from a producer. The media studio 19 may further perform other media processing operations, such as scaling, morphing, compositing, adding overlays, etc.

The server 12 may include a communications element 34 such as is known for communicating via the network 14 with the one or more media devices 16, one or more data collectors 17, one or more storage devices 18, and one or more media studios 19. The communications element 34 may include one or more known hardware and/or software elements, e.g., one or more transceivers for wired and/or wireless communications, as are known for communicating with a network 14.

The user interface 36 may include one or more input elements such as buttons, a key board, a touchscreen, a roller ball, a mouse, a microphone, switches, etc. for receiving input from a user. The user interface 36 may further include one or more display elements such as an LCD display, plasma display, speaker, lamps, light-emitting diodes, buzzers, etc. for outputting data to the user. The user interface 36 may be, e.g., included in the server 12, connected to the server 12 via a wired or wireless connection, or connected to the server 12 via the network 14. The user interface 36 may, e.g., include a graphical interface displayed on a touchscreen device and programmed to receive touch inputs from a user.

The network 14 represents one or more mechanisms for delivering media content between the server 12, the media devices 16, data collectors 17, storage devices 18, and media studios 19. Accordingly, the network 14 may comprise one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

Media content, such as the media input items and media output items, is generally delivered via the network 14 in a digital format, e.g., as compressed audio and/or video data, and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), or according to some other standard or standards. For example, media content could be audio data formatted according to standards such as MPEG-2 Audio Layer III (MP3), Advanced Audio Coding (AAC), etc. Further, the foregoing standards generally provide for including metadata.

Media devices 16 are generally programmed to capture media data, i.e., visual and sound data such as photographs, audio (for example, for running commentary), and videos, and transmit the visual and audio data, e.g., via the network 14 to the server 12. Examples of media devices 16 include portable devices such as digital cameras, smartphones, tablets, laptops, etc. Examples of digital devices 16 may further include security cameras, traffic cams, cameras transported by drones, etc.

Figure 3:
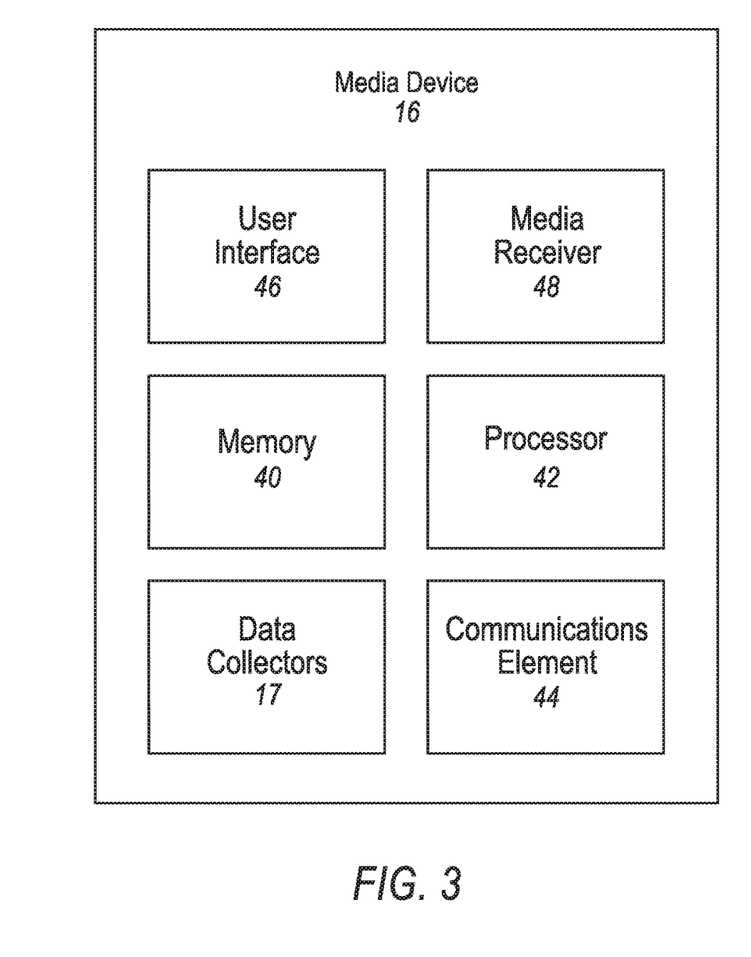
FIG. 3 is a block diagram of an exemplary media device for the media processing system of FIG. 1.

As shown in FIG. 3, a media device 16 may include a memory 40 and a processor 42, the memory 40 storing program code, i.e., computer-executable instructions, executable by the processor 42. The processor 42 may be communicatively coupled to a user interface 46, media receiver 48, a communications element 44, and data collectors 17.

The media receiver 48 includes one or more data receiving elements for receiving media data. The collected media data may include visual data and audio data. The media receiver 48 may include known elements, e.g., microphones for receiving sound data and CMOS or CCD image sensors for receiving image data.

The user interface 46 may include one or more input elements such as buttons, a key board, a touchscreen, a roller ball, a touchscreen, a mouse, a microphone, switches, etc. for receiving input from a user. The user interface 46 may further include one or more display elements such as an LCD display, plasma display, speaker, lamps, light-emitting diodes, buzzers, etc. for outputting data to the user. The user interface 46 may be, e.g., included in the media device 16 or connected to the media device 16 via the network 14 or other a wired or wireless connection. The user interface 46 may, e.g., include a graphical interface displayed on a touchscreen device and programmed to receive touch inputs from a user. The data collectors 17 may be used to determine, e.g., operating conditions of the media device 16, and may include accelerometers, gyroscopes, light meters, an internal compass, etc. The data collectors 17 may be used to measure, for example, movement of the media device 16 (shaking, tracking of an object's geo-coordinates, etc.), the direction that a video receiver (e.g., a lens) in the media device 16 is pointed, the light conditions under which the media device 16 is operating, etc. The direction that the video receiver is pointed may be an indication of the coverage range of the media device 16 at a particular time. The data collectors 17 may provide data to the processor 42, which may, e.g., send the data to the server 12 for additional processing.

The media device 16 may include a communications element 44 such as is known for communicating via the network 14 with, e.g., the server 12. The communications element 44 may include one or more known hardware and/or software elements, e.g., one or more transceivers for wired and/or wireless communications, as are known for communicating with a network 14.

The media device 16 may receive and transmit the media data, e.g., via the network 14, to the server 12. The received media data may be, as one example, full high-definition (Full HD) data, providing an image resolution of 1920 by 1080 pixels. Data formats with other resolutions may also be used.

The media device 16 may further receive data from, e.g., the server 12, and provide data, e.g., via the user interface 46, to the user of the media device 16. For example, as discussed below, the server 12 may determine, based on data received from the media device 16, that the media device 16 is shaking above a predetermined threshold, and/or the contrast of the media input item received from the media device 16 is too low. Still further, as discussed below, the server 12 may send rating data, indicating, e.g., a rating of the media input item received from the media device 16 for one or more characteristics, or ranking data, indicating, e.g., numerically, the ranking of the media input item received from the media device 16 in comparison to other media input items received from other media devices 16. The server 12 may send this data to the media device 16, which may display the information on the user interface 46.

The media processing system may include one or more data collectors 17, e.g., one or more known sensors. The data collectors 17 may be included in, e.g., one or more of the media devices 16. Additionally or alternatively, data collectors 17 may be standalone devices in communication with the network 14, wearable devices with sensors that are in direct or indirect (i.e., via another device) with the network 14, etc.

The data collectors 17 may include a variety of sensors including biometric sensors such as heart rate monitors, blood pressure monitors, etc.; movement sensors such as accelerometers, gyroscopes, etc.; position sensors such as global positioning systems, RFID tags, etc.; environmental sensors such as barometers, thermometers, light sensors, etc.; and other types of sensors which may provide data related to a recording event. The data collectors 17 may further include systems such a global positioning systems (GPS), weather tracking systems, etc. The data collectors may be independently operable to provide data, or may be included in one or more of the media devices 16, and provide data via, for example, a computing device in the media device 16. The data collectors 17 may include a user interface for receiving input from and providing output to a user. The user interface may be included in the data collectors 17 or remote to the data collectors 17 and connected to the data collectors via the network 14 or another wired or wireless connection.

The storage device 18 may store media data, and provide an interface to allow the server 12 to access the data via the network 14. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), a hard drive, etc. Further, the media storage device 18 may include a processor programmed, for example, to receive commands from the server 12. The processor may be further programmed, based on the commands, to retrieve media data items from data storage and send the media data items to the server 12. Additionally, the processor may be programmed, based on commands, to receive media data items from the server 12, and store them in data storage. The storage devices 18 may include a user interface for receiving input from and providing output to a user. The user interface may be included in the storage devices 18 or remote to the storage devices 18 and connected to the storage devices 18 via the network 14 or another wired or wireless connection.

Additionally, the media processing system 10 may include one or more media studios 19. The media studio 19 may include a memory and one or more processors configured to perform programs, i.e., sets of computer-executable instructions, stored in the memory. The media studio 19 may further include a communications element for communicating via the network 14, and a user interface.

In the case that a media studio 19 is included in the media processing system 10, the media studio 19 may perform some or all of media operations associated with generating a media output item. For example, the server 12 may select four media input items that it has received to provide to the media studio 19. The media studio 19 may generate a media output item based on the four media input items. The media studio 19 may generate the media output item based on a set of predetermined rules, input from a producer, or both. As described with regard to the server 12, the media studio 19 may also perform other media processing operations such as scaling, mixing, morphing, compositing, adding overlays, etc.

In some cases, the media studio 19 may receive the media input items from the respective media input devices 16, via, e.g., the network 14, based on input from the server 12. For example, the server 12 may receive data associated with one or more media input items from data collectors 17. Based on the data from the data collectors 17, the server 12 may determine candidate media input items for the media studio 19. The server 12 may, for example, via instructions to the respective media devices 16, network 14, and media studio 19, provide for the selected media input items to be received by the media studio 19.

The audio-video broadcaster 20 is programmed to receive one or more media output items, for example, for the server 12 or the media studio 19, and transmit the one or more media output items to, e.g., one or more display devices 21. In some cases, the audio-video broadcaster 20 may be a portion of the server 12 or the network 14. In other cases, the audio-video broadcaster may be a broadcast mechanism such as, for example, a satellite network configured to receive media output items and transmit the media output items to one or more display devices 21.

The display devices 21 are generally programmed to receive media output items from the server 12 or media studio 19 and provide the media output items to a user. Examples of media output items include mobile phones, laptop computers, tablets, desktop computers, etc. The display devices 21 include one or more display elements such as an LCD display, plasma display, etc. for displaying media to a user. The display devices 21 further include one or more communications elements for receiving wired or wireless transmissions. The display devices 21 may receive, for example, media output items via the network 14. As another example, the display devices 21 may receive media output items from the audio video broadcaster 20.

Processes
Hosting a Recording Event

The server 12 may be programmed to host a recording event. For example, a sponsor of a recording event may set up a website associated with the recording event on the server 12. The website may include information such as a recording event location and recording event time. The recording event location, as used herein, refers to one or more geographic areas that may be of interest for recording the event. For example, in the case of a football game, the recording event location may include a playing field for the game, and the seating surrounding the playing field. As another example, the recording event location for a marathon may be the path of the marathon, including surrounding areas where spectators may be standing, staging areas near the start and finish lines, etc. The recording event time as used herein is the period of time which the event sponsor would like to have recorded, such as, e.g., a period of time starting 30 minutes before an event starts and continuing until 30 minutes after completion of the event.

The server 12 may, for example, be set up to register and support accounts/profiles for one or more stakeholders in the recording event. Stakeholders may include, e.g., media providers, producers, viewers, investors, etc. A media provider, as used herein, is a user who, with use of a media device 16, provides media input items related to the recording event. A producer, as used herein, is a user who is given the ability to make decisions regarding the content of a media output item. A viewer, as used herein, is a user who, with use of, e.g., a display device 21 or other media device 16, uses (views, listens, purchases, shares with others, etc.) a media output item related to the recording event. An investor, as used herein, is a person or organization with a financial interest in the recording event.

As an example, the server 12 may collect personal information from the media providers such as name, address, amount of recording experience, etc. The server 12 may further collect data such as the type of media device 16 that the media provider intends to use for recording, an identification of the media device 16, an area of the event location that the media provider intends to record, a time during the event that the media provider intends to record, etc. Based on the information, the server 12 may create or update a media provider profile for each of the media providers, including some or all of the provided data.

Similarly, the server 12 may collect personal information from other stakeholders in the recording event and create and maintain respective profiles or accounts.

In some cases, the registration may be open and may generally allow stakeholders with network 14 access to register for the recording event. In other cases, registration may be based on invitation. The server 12 may, e.g., send invitations, with an authorization mechanism such as a code, rights, a certificate, etc., to a select number of potential stakeholders, and only accept registrations from persons having a valid authorization mechanism.

At the completion of registration, the server 12 may provide the media provider with login information, for example, a password or token, which the media provider may use to log into the recording event.

Initiating an Event

The server 12 may be programmed to allow media providers to log into a website associated with the recording event. The login may be limited in time, e.g., to a period of time that starts before the recording time by a first predetermined time period and ends a second predetermined time period after the recording event has ended. The server 12 may verify login information and provide access to the recording event for authorized media providers and/or authorized media devices 16. For example, the server 12 may assign data channels or network addresses for communications between the media devices 16 and the server 12.

Depending on the number of viewers, media providers, etc., the server 12 may estimate the resources, e.g., computing resources, storage, media studio resources, broadcaster modules, etc., required to be reserved for the event.

The server 12 may further support an owner of the event to, e.g., grant/confirm authorization to the media providers, producers, viewers, etc. participating in the recording event.

The server 12 may also receive, for example, an updated range of capture, indicating the area that the media provider intends to capture during the recording event or, for example, during a next portion of the recording event. The server 12 may further update profiles of each media provider to indicate its respective login time. In this manner, the server 12 may maintain an activity log of media providers.

Additionally, the server 12, or, e.g., a producer via the server 12, may run media checks with media devices 16 (and the associated media providers), populate initial media quality parameters, geographic locations, etc. The server 12 may provide feedback, independently, or based on input from, e.g., a producer, to make adjustments (e.g., change location, stop shaking the camera, reduce image brightness, correct focus, etc.).

Specifying Targets for Media Output Items

The server 12 may be programmed to generate multiple media output items for a recording event. The server 12 may generate the multiple media output items directly or indirectly, for example, with use of the media studio 19. For example, the server 12 may be programmed to generate a first media output item that is intended for a general audience or first group of viewers. The targets for this media output item may be to include high-quality media items, selected to show exciting occurrences during the event.

Additionally or alternatively, the server 12 may further be programmed to generate one or more media output items which include the performance of a particular participant during the event (a player, a team, a cheerleading squad), or feature the media input items from particular media providers (who may be tasked with capturing, for example, funny moments during the event). Each media output item may be specified by a set of targets that identify the quality parameters, excitement parameters, contents, media providers, etc. for the particular media output item.

The programming may be based, for example, on input from users. A user may request, for example, via the user interface 36, or via a user interface 46 in a media device 16, a media output item focused on a particular player/participant. For example, a parent of a child may be a media provider, i.e., may be operating a media device 16 that is providing a media input item. The parent may request, e.g., via the user interface 46 of the media device 16, that the server 12 generate a media output item focused on the parent's child.

Receiving Media Input Items

The server 12 may receive, via the communications channels or network addresses described above, media input items from one or more media devices 16. The media input items may be, e.g., a video of recording event, including visual and audio data. The server 12 may time synchronize the media input items to compensate for variations in transmission latency between the media input items. In addition to videos, the media input items may include other types of media data, for example, still photographs, soundtracks, etc. As described above, the media input items may be compressed or uncompressed data.

Receiving Event Related Data

The media processing system 10 may include one or more data collectors 17. As described above, the data collectors 17 may include a variety of sensors including biometric sensors such as heart rate monitors, blood pressure monitors, etc.; movement sensors such as accelerometers, gyroscopes, etc.; position sensors such as global positioning systems, RFID tags, etc.; environmental sensors such as barometers, thermometers, light sensors, etc.; and other types of sensors which may provide data related to a recording event. The data collectors 17 may further include systems such a global positioning systems (GPS), weather tracking systems, etc. The data collectors 17 may be independently operable to provide data, or may be included in one or more of the media devices 16, and provide data via, for example, the processor 42 in the media device 16.

Accordingly, the data collectors 17 may capture data related to the recording event, and send the data to the server 12. A nonlimiting list of examples of data that may be collected by the data collectors 17 includes    a. biometric data associated with the media providers such as heart rate and blood pressure;

b. operating data associated with the media devices 16 such as movement, orientation, lighting conditions, etc.;

c. position and movement data of recording event participants (persons, animals, objects, media devices 16, etc.);

d. noise and visual data associated with the spectators/audience of the recording event; and    e. weather and light conditions.

As described below, data received from the data collectors 17 may be used to determine, e.g., a quality level of a media input item, an excitement level of a media input item, an area of the recording event with a high level of activity, etc. Based on these determinations, the server 12 may further, e.g., rank the media input items, select one or more media input items as candidates for inclusion in media output items, provide feedback to media providers, etc.

Evaluating Media Input Items

The server 12 may evaluate the received media input items based on one or more criteria. The criteria may be general criteria such as quality or the excitement level of the content. Additionally or alternatively, the media input items may be evaluated for criteria related specifically to the targets of a particular media output item. For example, the target of a media output item may be to focus on a particular event participant (a player in a sports event, the bride in a wedding). In this case, the media input item may be evaluated for inclusion of the particular event participant. Examples of evaluating media input items are presented below.

a. Quality of the media input item: The server 12 may, based on the content of a media input item, and data associated with the media input item, determine a quality level related to the media input item. For example, the server 12 may determine a contrast level, and a steadiness level for the media input item. The server 12 may further compare the contrast and steadiness levels with predetermined optimum contrast and steadiness levels. Based on the comparisons, the server 12 may determine respectively a numerical rating for the contrast level and the steadiness levels. The server 12 may further determine an overall numerical rating for the quality of the media input. Other criteria, e.g., the focus of an image, the level of zoom of an image, the brightness of an image, etc., may be used in determining a quality rate for the media input item.

b. Excitement level of a media input item: The server 12 may, based on the content of the media input item and data associated with the media input item determine an excitement level related to the media input item. For example, the server 12 may determine, based on movement of a participant (person or object), noise level (e.g., cheering), movement data associated with the media device 16, biometric data such as blood pressure and heart rate of the media provider associated with a media device 16, etc., the excitement level. The server 12 may assign a numerical value to the excitement level by, for example, comparing the content and data associated with the media input item to predetermined thresholds or ratings tables. For example, movement of a participant that is faster than a predetermined threshold may be an indication of excitement. The predetermined threshold may be, for example, 6 meters/second. The speed of the participant may be measured based on, e.g., images in the media input item, data collectors 17 attached to the participant (accelerometers, gyroscopes), or global positioning data. As another example, a pulse rate of the media provider that is above a predetermined threshold may be an indication that the media input item being recorded by that media provider is exciting. The predetermined threshold for pulse rate may be determined, e.g., based on the general population. Alternatively, the pulse rate may be specific for a particular media provider, which may be, e.g., stored in a profile associated with the media provider. A typical predetermined threshold may be, e.g., 80 beats per second (BPS).

c. Position and/or capture range of the media device 16 associated with the media input item: The server 12 may assign a range of capture rating to a media input item based on the position and/or capture range of the media device 16 associated with a media input item. For example, the server 12 may, based on data from the data collectors 17, such as noise level, data indicating the position of event participants, etc., determine an area within the event location with a high level of interest. As one example, the recording event may be a bicycle race. The data from the data collectors 17 may indicate an area within the event location with a large number of race participants. The server 12 may assign a first range of capture rating to media devices 16 within a first predetermined distance of the area with the large number of race participants than to those media devices which are farther away from the area and a second, lower range of capture rating to media devices 16 that are not within the predetermined distance from the area. As another example, still considering a bicycle race, data collectors 17 in different areas of the event location may detect higher levels of noise, indicating that the race may be exciting in that area. The server 12 may assign a higher location rating to media devices 16 that are closer to the area with the higher levels of noise.

Based on one or more of the quality rating, the excitement level rating, and the range of capture rating, the server 12 may generate an overall rating of the media input item. For example, the overall rating may be a numerical value between 0 and 100. It may be determined, e.g., as:

Overall Rating=$a$(quality rating)+$b$(excitement rating)+$c$(range of capture rating), where $a$, $b$, and $c$ are scaled values respectively for the quality rating, excitement rating, and range of capture rating.

In addition to evaluating a media input item on characteristics such as quality, excitement level, and range of capture, other characteristics may be considered. For example, a media input item may be evaluated based on how prominently a particular person or team is displayed in the media input item, or based on the experience level or identity of the media provider operating a particular media input device 16, etc.

Generating ratings, as discussed above, may be done during the recording of a real-time event. Additionally or alternatively, ratings may be generated for media content that has been previously recorded and stored.

Determining Ranking

The server 12 may be programmed to establish a ranking of the media input items. For example, the server 12 may rank the media input items according to one or more ratings determined for each of the media items, with, e.g., the highest overall rating (as determined above), given the highest ranking. The rankings may be, e.g., numerical, with the highest ranking being assigned the value "one" and the lowest ranking being assigned the value "n" where n is the number of media input items that were evaluated.

In some cases, the server 12 may wish to generate more than one ranking. For example, a first ranking may be based on the quality, excitement level, and range of capture of a media input item, as described above. A second ranking may be based on other targets, such as the extent to which a particular participant in an event (team, player, mascot, actor in a play, etc.) is involved. Each ranking may be made based on a different set of criteria. The different sets of targets may be associated, for example, with different specified media output items.

The server 12 may further provide, e.g., an interactive map of the area where the event is recorded, including a real-time position of the participating media devices 16 and their respective statuses, and indicating with, e.g., color coding, excitement levels for various areas within the event location, for easier selection by the producer or viewer. The server 12 may further support the application of a variety of filters (e.g., quality, excitement level, etc.).

Selecting Media Input Items as Candidates for Inclusion in a Media Output Item

The server 12 may be programmed to select one or more media input items as candidates for inclusion in a media output item. For example, the server 12 may select the four highest-ranked media input items as candidates for inclusion in the media output item. The server 12 may then present the four selected candidates to a producer, e.g., on a user interface of the server 12, such that the producer can choose one of the four for generating the media output item. Alternatively, the server 12 may select between the four candidates based on a set of predetermined rules.

As described above, the server 12 may be programmed to generate more than one media output item, each media output item based on a different specified set of targets. The server 12 may generate a separate ranking of the media input items for each of the specified media output items, resulting in a different set of candidates being selected. Further, any number of candidate media input items may be selected for possible inclusion respectively in each media output item.

Further, the server 12 may be programmed to, e.g., collect viewing histories of one or more viewers and identify preferences, interests, etc. Based on the viewing histories, the server 12 may select (or recommend) particular media output items for particular viewers or viewer display devices 21.

The server 12 may evaluate and select media input items to be included in a media output item during the recording of an event. Additionally or alternatively, the server 12 may select media input items for inclusion in a media output item from previously recorded and stored data. For example, one or media input items from a recording event may be stored along with their respective metadata and other event-related data collected by data collectors 17. The server 12 may, based on the stored media input items, metadata, and other collected data, evaluate and select media input items for inclusion in the media output item.

Providing Feedback to Media Providers

The server 12 may provide feedback to media providers related to their respective media input items. For example, the server 12 may determine one or more ratings and/or rankings for a media input item as described above. The server 12 may, based on the ratings and/or rankings, provide quantitative feedback to the media provider of the media input item. The feedback may include, for example, the quality rating, excitement rating, range of capture rating, etc. of a media input item, or a ranking of the media input item relative to other media input items. The server 12 may additionally provide recommendations, such as a recommended camera setting, a recommended range of capture for recording, a recommended use of a tripod, etc. The feedback may be presented to the media provider via the user interface 46 of the media device 16 associated with the media input item.

The feedback may be provided to the media providers dynamically during the recording event, such that the media providers can make adjustments and can, e.g., attempt to improve their ranking, in order that their media input item is included as a candidate for the generating a media output item.

The server 12 may further allow the producer to exchange messages with the media providers, e.g., via text or speech. For example, the producer may request that a media provider record the coach in portrait mode, record the fans, etc. The server 12 may provide templates of messages/recording commands that the producer may use or edit for generating the messages. The server 12 may also collect viewing statistics per media output item and make the statistics available to the producers, media providers, etc.

Generating a Media Output Item from One or More Input Media Items

The server 12 is programmed to generate one or more media output items based on the one or more media input items. Each output item may be generated based on a different set of targets. For example, a target for a media output item may be a high-quality recording of the event focusing on exciting occurrences during the event. As another example, a target for a media output item may be a recording focused on a particular actor in a play.

As described above, the server 12 may receive and evaluate one or more media input items. The server 12 may further generate ratings and/or rankings for the one or more media input items. Based on the ratings and/or rankings, the server 12 may select from a large number of media input items, a smaller number, for example, four, media input items as potential candidates for a media output item.

Based on the selected candidates at any given time, the server 12 may select one of the media input items to display in the media output item. The selection may further be based on a predetermined rule. For example, the selection may be based on the range of capture rating of the media input item, on the excitement rating of the media input item, on the media provider who generated the media input item, etc. The server 12 may be programmed to switch between candidate media input items on a regular basis, for example, every four seconds.

Further, the server 12 may be programmed to receive input from a producer. For example, the server 12 may present an aggregated media item to the producer. The aggregated media item may include all media input items (for example, as small, reduced resolution images) or candidate media input items. The server 12 may display the aggregated media item to the producer on the user interface 36 of the server 12. The producer may, via the user interface 36, select the media input item to be displayed in the media output item.

As noted above, the server 12 may, e.g., receive compressed data from the media devices 16. The server 12 may then decompress the media input items for processing. Following processing, the server 12 may recompress the media output item, for transmission to a media device 16 for viewing or for storage in a storage device 18.

Real-Time Viewing Based on Viewer Selection

The server 12 may provide the aggregated media item, as described above, to one or more viewers of the recording event. The viewers may select, from the aggregated media item, a particular media input item to view on a media device 16 or viewer display device 21. The server 12 may, based on the selection, transmit the media input item to the media device 16. The viewers may, e.g., view the selected media input items in real time.

The server 12 may also add advertisements. The advertisements may be added, for example, to the user interface 46 of the media device 16 or user interface of the viewer display device 21. Additionally, advertisements may be added to the media output items. The server 12 may further collect viewer ratings and feedback regarding media output items and regarding the recording event.

In the case that multiple viewers are authorized to select and receive media input items for viewing, the server 12 may additionally provide feedback to the media provider indicating the popularity of their media input item. For example, the server 12 may determine how many viewers are viewing each media input item, and provide that data to the media provider operating the particular media device 16.

Exemplary Process Flows

Figure 4:
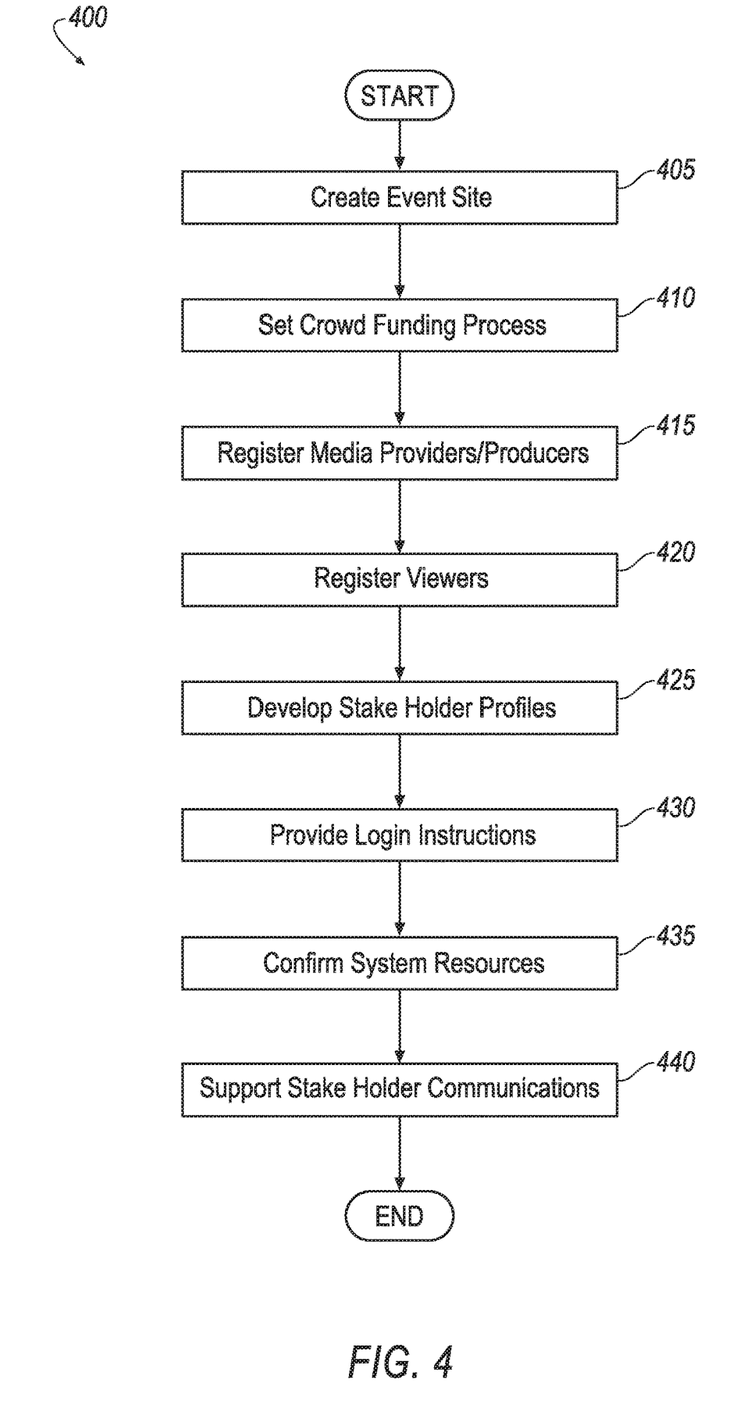
FIG. 4 is a diagram of an exemplary process for registering one or more stakeholders for participation in a recording event.

FIG. 4 is a diagram of an exemplary process 400 to register one or more media providers for participation in a recording event. The process 400 starts in a block 405.

In the block 405, a host mechanism for a recording event such as a website may be created by an event sponsor on the server 12. As described above, the event sponsor may indicate a time location of the event, a time of the event, the subject matter (e.g., company picnic, football game, etc.), and other data relevant to the recording event (sponsors, potential audience, etc.). The host mechanism may further include, e.g., instructions for a crowd-funding process, instructions to register as a media provider, instructions to register as a producer, instructions for viewing the recording event live, instructions for requesting (or ordering) a recording (standard or customized) of the event, etc. Upon setting up the host mechanism, the process 400 continues in a block 410.

In the block 410, the server 12 may, optionally, implement, based for example on instructions for the event owners, a crowd-funding process for the recording event. The server 12 may provide investment information to one or more potential investors. The server 12 may support the registration of investors, receive and track investments from investors, etc. The process continues in a block 415. In the case that the owners do not request the implementation of a crowd-funding process, the block 410 may be skipped and the process 400 may go directly from the block 405 to the block 415.

In the block 415, the server 12 may register media providers and/or producers for the recording event. As described above, the server 12 may collect personal information such as name, address, amount of recording experience, etc. from each of the media providers and/or producers. With regard to the media providers, the server 12 may collect data such as the type of media device 16 that the media provider intends to use for recording, an identification of the media device 16 an area of the event location that the media provider intends to record, a time during the event that the media provider intends to record, etc. Similarly, with regard to the producer, the server 12 may collect data such as the type of media device 16, user interface, etc., that the producer intends to use to produce the event. The server may further collect information such as targets (goals) for the media output item that the producer intends to produce, target viewers for the media output item, etc.

The registration for media providers and producers may be open, i.e., available to anyone who can access the host mechanism. Alternatively, registration may be based on invitations. The sponsor may, for example, via the server 12, send invitations including authorization codes to particular media providers and/or producers to participate in the recording event. The media providers and/or producers may then access the server 12 host mechanism and, with use of the authorization code, register to be a media provider and/or producer for the recording event.

Further, in some cases, the roles of media provider and/or producer may be paid roles. In these cases, the server 12 may, for example, support an application/bidding process for these roles. As an example, potential producers may place bids, indicating how much the producer would charge to fulfill the responsibilities of producer for the recording event. Based on the bids, for example, an owner of the recording event may select a producer for the recording event. The process 400 continues in a block 420.

In the block 420, the server 12 may register viewers. The server 12 may provide information to potential viewers regarding available output media items for the recording event. The viewers may select one or more of the media output items to view. In some cases, the viewers may need to pay a fee to watch a particular media output item. The server 12 may collect payment from the viewer and provide access codes, tokens, passwords, etc. to enable the viewer to receive the media output item. The process continues in a block 425.

In the block 425, the server 12 may set up and/or update profiles for stakeholders of the recording event. The profiles may include personal information such as the name, address, type of media device 16, type of viewer display device 21, type of user interface, etc., that will be used during the recording event. The stakeholder profiles may also include historical data collected with regard to the stakeholders.

For example, with regard to media providers, the profile may include data such as a listing of other recording events in which the media provider participated. The listing may include, e.g., ratings such as the quality rating, excitement rating, etc. of the previous recordings, the number of viewers of previous recordings, etc.

Additionally, the media provide may provide inputs regarding a target player that the media provider would like to follow or, e.g., a target type of media input item (funny moments, excitement, etc.) that the media provider would like to record. The input may be provided, for example, via the user interface 46 on the media device 16. As an example, a parent (media provider), may input the parent's preference by selecting his or her child from a list provided on the user interface 46. The server 12 may use input provided from the one or more media providers to identify a theme around the recording event. The theme may be used to help define the content of media output items.

With regard to viewers, the profile may include previous recording events viewed by the viewer, feedback provided by the viewer, etc. The profile may further include input provided by the viewers. The process 400 continues in a block 430.

In the block 420, the server 12 may provide login instructions to the media provider, producer, viewer, and other recording event stakeholders. The login instructions may include, e.g., a login identification and a password, token etc., which the stakeholder may use at the time of the recording event. The login instructions may further include information such as a login address, the time that the login process will open on the day of the event, etc. Upon providing login information to each of the registered stakeholders, the process 400 continues in a block 435.

In the block 435, the server 12 may evaluate and confirm that availability of resources required for the recording event. Based on the number of media providers, producers, viewers, planned media output items, etc., the server 12 may determine the computing resources, media studio resources, communications (e.g., WiFi) resources, etc. required to support the recording event, and provide this information to, e.g., the event owners or event producers. Based on the information, the server 12 may independently, and based on instructions from the event owners, event producers, server operators, etc., allocate the necessary resources during the recording event. The process continues in a block 440.

Figure 5:
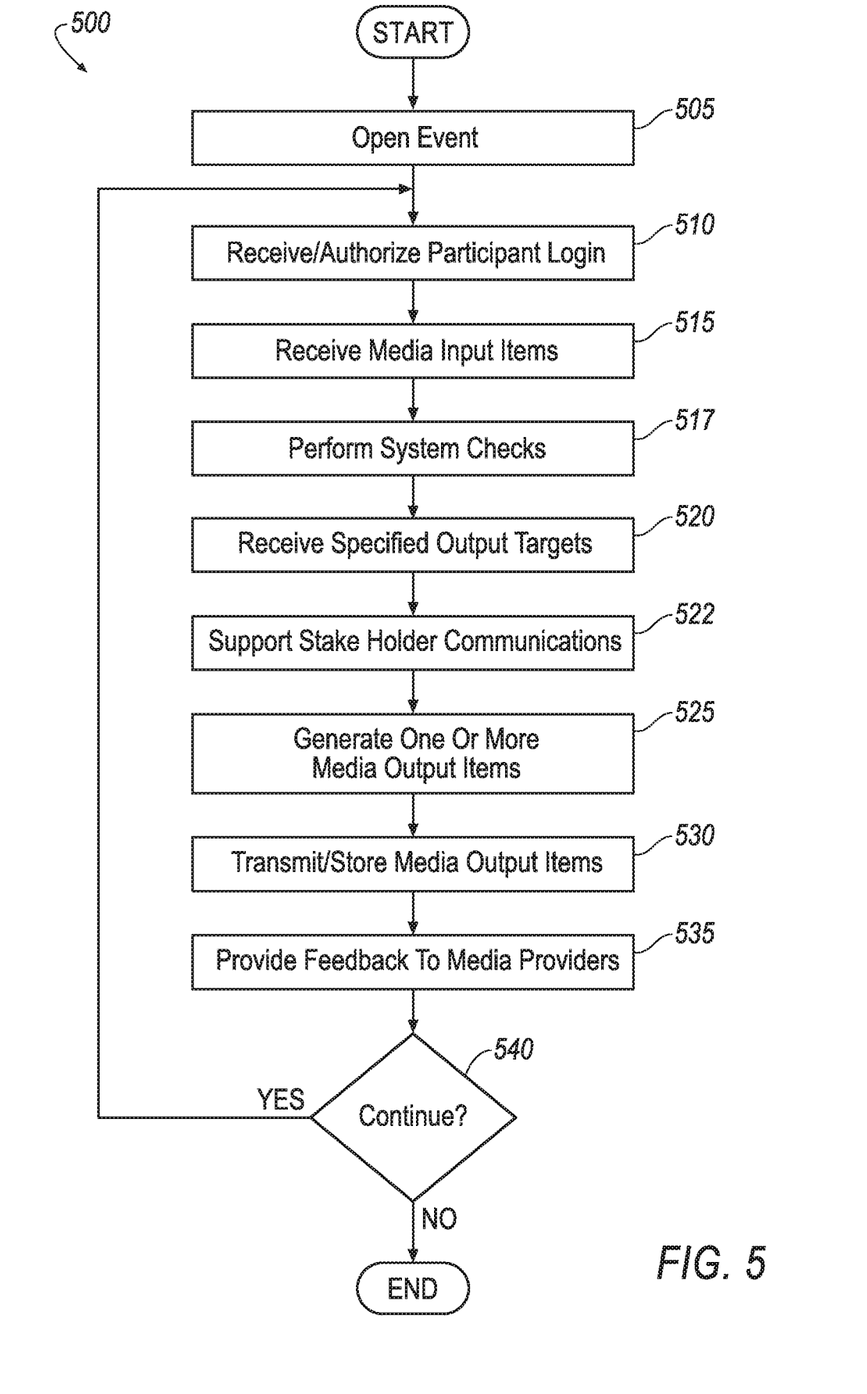
FIG. 5 is a diagram of an exemplary process for receiving media input items from one or more media providers via a network and selecting media items for inclusion in a media output item.

In the block 440, the server 12 supports communications between the stakeholders of the recording event. For example, the server 12 may receive preliminary instructions from producers and send the preliminary instructions to the media producers. As another example, the server 12 may receive updated information regarding the requested media output items from viewers, and provide the updated information to the producers. The block 440 may operate until, for example, the beginning of the recording event. When the recording event begins, the process 400 may end, and the process 500, described below, may begin. Although described as two separate processes, the processes 400 and 500 may also be combined.

FIG. 5 is a diagram for an exemplary process 500 for receiving media input items from one or more media providers via a network and selecting media items for inclusion in a media output item. The process 500 starts in a block 505.

In the block 505, the server 12 opens the recording event for login by one or more media providers, producers, viewers, etc. The server 12 provides an interface for entering login identification, password, tokens, etc. The server 12 may further send reminders to registered media providers, producers, viewers, etc. that the login is open. The process 500 continues in a block 510.

In the block 510, the server 12 receives and authorizes logins from media providers, producers, viewers, etc. For example, the server 12 may receive, via the communications element 34, a login request from a media provider. The login request may include login identification and a password. The server 12 may verify the login identification and password and authorize the media provider to participate in the recording event. The server 12 may provide a communications channel for receiving a media input item from a media device 16 operated by the media provider. The process 500 continues in a block 515.

In the block 515, the server 12 receives media input items from one or more media devices 16. As described above, the media input items may be streamed video and audio, still photographs, sound tracks, etc. The media input items may be uncompressed data or may be compressed according to a compression format, such as, e.g., H.264/MPEG-4 Advanced Video Coding standards (AVC) or another compression format. The server 12 may decompress the media input items, and may further time synchronize the media input items to compensate for differences in transmission latency between the various media input items. The process 500 continues in a block 517.

In the block 517, the server 12 may perform a system check. The server 12 may verify, e.g., the operability of transmission channels between the server 12 and media devices 16, viewer display devices 21, a user interface on a media studio 19, etc. The server 12 may further confirm that computing resources (e.g., computing devices included within the server 12) are connected and operating. The process 500 continues in a block 520.

In the block 520, the server may receive specifications for one or more media output items. The specifications may include targets for the quality of the media output item, the excitement level for the media output item, the contents (participants, area, etc.) of the media output item, the media providers for the media output item, etc. The process 500 continues in a block 522.

In the block 522, the server 12 supports communications between recording event stakeholders. The server 12 may receive instructions from producers and send the instructions to the media producers. The server 12 may further receive updated information regarding the requested media output items from viewers, and provide the updated information to the producers. In the case that the process 400 and 500 are combined, the block 522 may be a continuation of the block 440 described with regard to the process 400. The process 500 continues in a block 525.

In the block 525, the server 12 generates one or media output items. As described in detail above, the server 12 may evaluate each of the one or more media input items received from the media providers. The server 12 may assign ratings to each of the media input items with regard to, e.g., quality, excitement level, capture range, content (e.g., presence of a particular participant), etc. The server 12 may further rank the media input items according to targets associated with different media output items. Based on the rankings, or according to other criteria, the server 12 may identify candidate media input items for inclusion in a particular media output item.

The server 12 may then, according to a set of rules, display one or more of the media input items in a particular media output item. Additionally or alternatively, the server 12 may present the candidates to a producer via a user interface. The user interface may be, for example, the server 12 user interface 36, a media device 16 user interface 46, a user interface on a media studio 19, etc. The producer may select, via the server 12 user interface 36, media device 16 user interface 46, or media studio 19 user interface, a media input item for inclusion in the media output item.

Further, as described above, the server 12 may perform, according to predetermined rules, or according to producer input, other media processing operations such as scaling, mixing, morphing, compositing, adding overlays, etc. The process 500 continues in a block 530.

In the block 530, the server 12 transmits and/or stores the media output items. For example, the server 12 may transmit the media output items to one or more media devices 16 for viewing. In the case that a media studio 19 is available, one or more of the media output items may be transmitted to the media studio 19 for further processing. Additionally, the server 12 may store the media output items in a storage device 18 for later use. The process 500 continues in a block 535.

In the block 535, the server 12 may provide feedback to the media providers regarding their respective media input items. The feedback may include rating and/or ranking information regarding their media input item. The feedback may further include, e.g., tips, such as adjusting the contrast, changing the range of coverage, using a tripod to achieve more stability, etc. The process 500 continues in a block 540.

In the block 540, the server 12 determines if the process 500 should continue. For example, the process 500 may be set to start 30 minutes prior to a particular event (for example, a sports event), and to continue for a particular period of time, e.g. three hours, or until it receives user input (for example from the producer) to end the event. In the case that the server 12 determines that the period of time has not elapsed, and/or the server 12 has not received user input ending the recording event, the process 500 continues with the block 510. When the server 12 determines that the period of time has elapsed, and/or that the server 12 has received user input ending the recording event, the process 500 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computing device including a processor and a memory, the memory storing instructions executable by the processor such that the processor is programmed to:
    establish, for a recording event, one or more communications channels associated with each of a plurality of media devices, the plurality of media devices coupled with a plurality of data collectors;
    receive data from the plurality of data collectors in association with the plurality of media devices capturing a plurality of media input items for the recording event, the data indicating, for each of the plurality of media input items, an overall rating of the respective media input item computed as a function of applying a first scaled value to a first numerical value corresponding to a quality rating of the respective media input item, applying a second scaled value to a second numerical value corresponding to an excitement rating of the respective media input item, and applying a third scaled value to a third numerical value corresponding to a range of capture rating of the respective media input item;
    determine, based on the data, rankings of the plurality of media input items, the rankings indicating respective preference levels for including each of the plurality of media input items in a media output item;
    select one or more of the media input items as candidates for inclusion in the media output item based at least in part on the rankings; and
    instruct communication of the one or more of the media input items to a media studio for generation, by the media studio, of a media output item from the one or more of the media input items based at least in part on the data.

2. The system of claim 1, wherein the processor is programmed to:
    determine the rankings by determining, based on the data, a numerical ranking of each of the media input items, and
    select the one or more of the media input items as candidates by selecting a subset of the plurality of media input items having the highest numerical rankings.

3. The system of claim 2, wherein the processor is further programmed to:
    transmit, to each of the media devices, the ranking of the respective media input item.

4. The system of claim 1, wherein the processor is further programmed to:
    authorize participation in the recording event based on one of an identity of the media device and an identity of an operator of the respective media device.

5. The system of claim 1, wherein the processor is further programmed to:
    receive data relating to one or more areas included in a location of the event;
    determine, based on the data related to the one or more areas, a level of interest of the one or more areas; and
    select media input items for inclusion in the media output item based at least in part on the relative level of interest of the one or more areas.

6. The system of claim 5, wherein the processor is further programmed to:
    transmit, to the one or more media devices, further data related to the level of interest of the one or more areas.

7. The system of claim 1, wherein the processor is further programmed to:
    generate an aggregated media item including representations of the one or more media input items; and
    display the aggregated media item on a user interface.

8. The system of claim 7, wherein the processor is further programmed to:
    receive, via the user interface, a selection of one or more media input items from the aggregated media item for inclusion in the media output item.

9. A method comprising:
    establishing, by a computing device, for a recording event, one or more communications channels associated with a plurality of media devices, the plurality of media devices coupled with a plurality of data collectors;

receiving data from the plurality of data collectors in association with the plurality of media devices capturing a plurality of media input items for the recording event, the data indicating, for each of the plurality of media input items, an overall rating of the respective media input item computed as a function of applying a first scaled value to a first numerical value corresponding to a quality rating of the respective media input item, applying a second scaled value to a second numerical value corresponding to an excitement rating of the respective media input item, and applying a third scaled value to a third numerical value corresponding to a range of capture rating of the respective media input item;

determining, based on the data, rankings of the plurality of media input items, the rankings indicating respective preference levels for including each of the plurality of media input items in a media output item;

selecting one or more of the media input items as candidates for inclusion in the media output item based at least in part on the rankings; and instructing communication of the one or more of the media input items to a media studio for generation, by the media studio, of a media output item from the one or more of the media input items based at least in part on the data.

10. The method of claim 9, wherein:

the determining comprises determining, based on the data, a numerical ranking of each of the media input items, and the selecting the one or more of the media input items for inclusion comprises selecting a subset of the plurality of media input items having the highest numerical rankings.

11. The method of claim 10, further comprising:
transmitting, to each of the media devices, the ranking of the respective media input item.

12. The method of claim 9, further comprising:
authorizing participation in the recording event based on one of an identity of the media device and an identity of an operator of the respective media device.

13. The method of claim 9, further comprising:
receiving data relating to one or more areas included in a location of the event; determining, based on the data related to the one or more areas, a level of interest of the one or more areas; and selecting media input items for inclusion in the media output item based at least in part on the relative level of interest of the one or more areas.

14. The method of claim 13, further comprising:
transmitting, to the one or more media devices, further data related to the level of interest of the one or more areas.

15. The method of claim 9, further comprising:
generating an aggregated media item including representations of the one or more media input items; and
displaying the aggregated media item on a user interface.

16. The method of claim 15, further comprising:
receiving, via the user interface, a selection of one or more media input items from the aggregated media item for inclusion in the media output item.

\* \* \* \* \*